US United States Patent [19]

Richardson

[11] Patent Number: 4,617,994
[45] Date of Patent: Oct. 21, 1986

[54] DETERMINING RESIDUAL OIL SATURATION BY INJECTING $CO_2$ AND BASE GENERATING REACTANT

[75] Inventor: Edwin A. Richardson, Houston, Tex.

[73] Assignee: Shell Oil Company, Houston, Tex.

[21] Appl. No.: 800,852

[22] Filed: Nov. 22, 1985

[51] Int. Cl.$^4$ .............................................. E21B 47/00
[52] U.S. Cl. ..................................... 166/250; 73/155; 166/300; 436/27
[58] Field of Search ............... 166/250, 252, 300, 270; 73/155; 436/27, 28, 29

[56] References Cited

U.S. PATENT DOCUMENTS

| | | | |
|---|---|---|---|
| 3,856,468 | 12/1974 | Keller | 436/27 |
| 3,892,275 | 7/1975 | Lybarger et al. | 166/300 X |
| 4,178,993 | 12/1979 | Richardson et al. | 166/300 |
| 4,330,037 | 5/1982 | Richardson et al. | 166/300 X |
| 4,406,327 | 9/1983 | Fair et al. | 166/300 |

Primary Examiner—George A. Suchfield

[57] ABSTRACT

Residual oil saturation is determined by injecting water containing dissolved $CO_2$ and subsequently active base generating reactant into an oil and water containing reservoir and chromatographically analyzing the patterns of the concentrations of in situ reaction-depleted $CO_2$ and reaction-increased bicarbonate salt in fluid produced from the reservoir.

5 Claims, No Drawings

DETERMINING RESIDUAL OIL SATURATION BY INJECTING $CO_2$ AND BASE GENERATING REACTANT

RELATED APPLICATION

The present application is related to my commonly assigned and concurrently filed patent application Ser. No. 800,849, relating to determining residual oil saturation by injecting salts of carbonic and halocarboxylic acids. The disclosures of that application are incorporated herein by reference.

BACKGROUND OF THE INVENTION

This invention relates to determining the relative concentrations of fluids within subterranean reservoirs by measuring the chromatographic separation of tracers having distinctly different partitioning coefficients with mobile and immobile phases (such as water and oil phases) of fluids within the reservoirs. More particularly, the present invention relates to improving a process for making such determinations by injecting an aqueous solution of reactants which form tracers inclusive of one which is significantly partitioned between such mobile and immobile phases and one which is substantially completely dissolved in the mobile phase.

In 1969 a method for determining the relative amounts of mobile and immobile fluid phases within a subterranean reservoir by injecting carrier fluid containing a reactant capable of forming within the formation at least two tracers which have different partitioning coefficients between the carrier fluid and the immobile fluid phase (exemplified by the tracers formed by a hydrolyzable organic ester) and measuring the separation of the tracers, was described in U.S. Pat. No. 3,623,842. U.S. Pat. No. 3,751,226 by R. J. Hesse and R. F. Farmer relates to improving such a process by injecting a solution in which the tracer forming reactant is a hydrolyzable beta-keto ester such as ethylacetoacetate. U.S. Pat. No. 3,847,548 relates to improving such a process by injecting carrier fluid containing tracers which partition differently in respect to temperature changes and injecting that fluid at a temperature different from the reservoir temperature. U.S. Pat. No. 3,856,468 relates to improving such a process by injecting carrier fluid containing both a precursor which forms a tracer material that partitions between the fluid phases and a tracer material which is inert and substantially completely dissolved in a mobile phase. U.S. Pat. No. 3,990,298 relates to improving such a process by injecting a carrier fluid containing a plurality of precursors each of which forms a tracer which has a distinctive partition coefficient with at least one immobile fluid phase within the reservoir. U.S. Pat. Nos. 4,099,565 and 4,168,746 relate to uses of such a fluid saturation determining process in the course of evaluating the effectiveness of a design process for recovering oil.

SUMMARY OF THE INVENTION

The present invention relates to a process for determining relative concentrations of a substantially immobile oil phase fluid and a relatively mobile water phase fluid within a subterranean reservoir formation. The reservoir is injected with fluid which consists essentially of a slug of aqueous solution which at least soon after entering the reservoir formation, contains at least a concentration of dissolved $CO_2$ and a concentration of subsequently active and water-soluble and oil insoluble pH-increasing reactive material which, at the temperature of the reservoir formation, is sufficient to convert at least a significant proportion of the dissolved $CO_2$ to dissolved bicarbonate ions, followed by at least a slug of an aqueous solution which contains at least a detectible concentration of dissolved $CO_2$ and is free of pH-increasing reactant. The injected fluid is kept within the reservoir formation long enough to allow an occurrence of the pH-increasing reaction. The injected fluid is then produced by backflowing it while measuring variations in the concentration with amount produced of both dissolved $CO_2$ and dissolved bicarbonate ion. Determinations based on the chromatographic separation between the occurrence of the reduction in the concentration of dissolved $CO_2$ and the occurrence of the increase in concentration of dissolved bicarbonate ion are made of the relative concentrations of the oil phase and water phase fluids in the reservoir.

DESCRIPTION OF THE INVENTION

It appears that in conventional testing operations the only tracer-forming reactants and procedures which have been successfully used have been those described in U.S. Pat. No. 3,623,842, using hydrolyzable lower alkyl carboxylic acid esters or beta-ketoalkyl carboxylic acid esters. With such esters an unreacted ester or ketone is the tracer which is partitioning between the water and oil (or other mobile and immobile phases) and an alcohol or other reaction product which is substantially completely dissolved in the water phase is the tracer for the water.

Such prior processes have received wide industry acceptance, as the "single well tracer method", and more than a hundred jobs have been done. But, in general, the dependance upon organic esters has limited the use of the method to reservoirs having relatively low temperatures.

In general, the present invention comprises a process for determining relative concentrations of fluids in the reservoir which method is suitable for substantially any of the uses proposed for the prior methods mentioned above and is suitable for use at much higher temperatures. The present invention is improved relative to those prior processes by (1) using carbon dioxide as the tracer that partitions between the immobile oil phase and the mobile water phase and (2) using a reaction-induced depression of the dissolved $CO_2$ concentration and a concurrently-induced elevation of dissolved bicarbonate ion concentration as the markers of the chromatographic separation by which the relative amounts of the fluid phases within the reservoir can be determined.

The present use of a depression rather than an elevation in the concentration of an oil phase tracer material as a marker for determining the extent of chromatographic separation, appears to be novel. It involves a mechanism which is or appears to be, the following: as the pH of the injected fluid containing both a pH-increasing reactant and dissolved $CO_2$ is increased, the carbonic acid, which is inherently in equilibrium with the dissolved $CO_2$ is neutralized to form dissolved bicarbonate ion. This shifts the equilibrium and results in converting additional dissolved $CO_2$ to dissolved bicarbonate ion. When the resultant $CO_2$-depleted and bicarbonate ion-enchanced solution is flowed through the reservoir formation, the transport of the wave of depleted $CO_2$ concentration is delayed relative to that of the wave of increased bicarbonate ion concentration, due to the leaching or eluting of $CO_2$ from the oil. When a relatively $CO_2$-rich oil is contacted by the relatively $CO_2$-poor aqueous fluid, it transfers $CO_2$ into that fluid so that the wave of $CO_2$ depression is delayed relative to the wave of the increased bicarbonate ion concentration. With the bicarbonate ions no such transfer can take place because of zero solubility of bicarbonate salts in oil. Such concentration changes become separated in a manner similar to that of the separation between a wave of increased concentration of and oil-tracer tracer and an increased concentration of non-partitioning water-tracer. As known in the art, the calculations involved in using such a $CO_2$ concentration-depression as the marker of the extent of chromatographic separation are the same type as those involved in using an increase in a tracer concentration for that purpose.

COMPARISON OF TRACER CAPABILITIES (1) Temperature Range

In typical prior processes an organic ester which is partially soluble in oil serves as the oil phase tracer which is injected at the wellbore and displaced to the desired distance from the wellbore by an inert fluid. A soak period then allows time for a hydrolysis reaction to take place and produce a significant amount of alcohol. The alcohol is not soluble in the oil and thus serves as the water phase tracer.

The hydrolyses step must not be too fast since it is undesirable for the alcohol to be produced during the placement step and also, some unreacted ester must remain after the soak period as it is the oil phase tracer. At the end of the soak period, both tracers are produced back to the wellbore. The amount of chromatographic separation of the two tracers is measured and used to calculate residual oil saturation.

If the reservoir temperature is above about 200° F., the hydrolysis rate of most, if not all, known esters is so fast that the above requirements cannot be met. Therefore, the prior processes have been limited to reservoirs of about 200° F. or less.

A very large number of choices are available for selection of the "Base Generators" (i.e., pH-increasing reactants). A few examples are given in Table I, along with a best estimate of the applicable temperature range for each listed Base Generator:

TABLE I

| BASE GENERATOR | TEMPERATURE RANGE °F. |
|---|---|
| KOCN | 70 to 110 |
| UREA | 200 to 250 |
| NaNO$_2$ | 210 to 280 |

(2) Deeper Penetration (depth of investigation) from the Wellbore

The reactions by which a base is formed by typical base generating reactants suitable for use in the present process are listed in Table II

TABLE II

| COMPOUND | | BASE |
|---|---|---|
| Urea | CO(NH$_2$)$_2$ + 3H$_2$O | NH$_4$HCO$_3$ + NH$_4$OH |
| Potassium Cyanate | KOCN + 3H$_2$O | NH$_4$HCO$_3$ + KOH |
| Sodium Nitrite | 3NaNO$_2$ + 3H$_2$O | NaNO$_3$ + 2NO + 2NaOH |
| Urea and Sodium Nitrite | 2NaNO$_2$ + CO(NH$_2$)$_2$ + | 2N$_2$ + NaHCO$_3$ + NaOH |

TABLE II-continued

| COMPOUND | | BASE |
|---|---|---|
| Propylene Oxide | H$_2$O CH$_3$CHCH$_2$ (epoxide) + NaCl + H$_2$O | CH$_3$CHOHCH$_2$Cl + NaOH |

In commonly used processes the oil phase tracer is ethylacetate which is injected with an aqueous carrier fluid. It partitions between the oil in the reservoir and the water of the carrier fluid. The effect is to retard the advance of the ester front into the reservoir. In most cases the ester will reach a distance corresponding to a volume of only about one-third that of the volume of the total fluid injected.

In the present process the situation is different. The oil phase tracer is a reaction-induced dip in the concentration of $CO_2$ dissolved in an aqueous carrier fluid. Some reservoirs contain $CO_2$ which is partitioned to an equilibrated extent between the water and the oil phase fluids within the reservoir. When the fluid produced from such a reservoir is used as the aqueous solution containing $CO_2$ injected in accordance with the present process, the injection causes no further $CO_2$ partitioning. In other reservoirs a portion of water containing dissolved $CO_2$ but no dissolved base generating reactant is preferably injected ahead of the solution containing both dissolved $CO_2$ and dissolved Base Generating reactant. This ensures that $CO_2$ is present at the distance from the well in which the reservoir is to be tested. The $CO_2$ and base generating reactant-containing solution is displaced to the selected distance by injecting an aqueous fluid which contains at least about the same amount of dissolved $CO_2$ but is free of the base generating reactant. Since the base generating reactant is selectively water miscible, the subsequently formed depressed concentration of $CO_2$, i.e., the oil phase tracer of the present system, will penetrate farther into the formation than an ester system tracer (for a given volume of treatment) and will provide a residual oil measurement over about 3 times the volume of reservoir sampled by the prior system.

(3) Distribution Coefficient

The distribution coefficient, Ki, (ratio of concentration of tracer in the oil phase to that in the water phase) of esters is about 6 in most cases. Ki for $CO_2$ is about 2.

The $CO_2$ value for Ki is much more optimum from a test sensitivity point of view in most cases, since more of it is present in the water phase, which comprises substantially all of the produced fluid.

Also, the present type of tracer will be produced back to the wellbore much sooner than an equivalent ester tracer would be. If this property is combined with the smaller volumes needed for sampling the reservoir, because of deeper penetrating capability of the present tracer, only small jobs may be necessary. In this case, several small tests could be run on different wells instead of the one large ester test as currently practiced. This would give better overall reservoir values for Sor (residual oil saturation) than is currently possible.

(4) Drift During Soak Period

In most reservoirs, fluid injected into a well will drift with the overall reservoir fluids when the pumps are shut down. This may be as much as a few feet per day.

In the ester system, long soak periods are frequently required. This makes drift an important source of error, for which corrections must be made. Also, considerable accuracy and sensitivity is lost in the process.

In the present system, the wide choice of base generators which react at different rates at different temperatures coupled with more rapid backflow will greatly diminish the effect of drift in many cases. This is because base generators can be more optimally selected to correspond to the reservoir temperature involved. Also, the water tracer and oil tracer will stay much closer together in the reservoir and hence cancel much of the errors introduced by the reservoir drift velocity.

(5) Miscellaneous (a) A more precise positioning of the $CO_2$-depleting base generator in the reservoir may make it possible to use frontal analysis techniques on the tracers instead of band analyses used for the ester. Frontal analyses should be more accurate.

(b) In some cases, very small amounts of $CO_2$ may be sufficient due to the high sensitivity and stability of the analyses systems.

(c) If drift is minimal, simple methods of analyzing the data and calculating the residual oil saturation may be possible.

In general, with modifications apparent to those skilled in the art, the present process can be utilized in substantially any of the reservoir situations of fluid saturation determining processes for which the prior processes were suitable.

Table III lists results of testing various base generators at various temperatures and pH's. In each case, the solution was maintained at a pressure of 50 psig during the test. The pH of the solution was maintained substantially constant by adding portions at 0.1 mol/liter sodium bicarbonate solution to the system while the hydrolysis was proceeding. Each base generator solution consisted of water containing 0.5 mol/liter sodium chloride and 0.05 mols/liter of the base generator.

TABLE III

Hydrolysis Data - Screening Tests
Conditions: (1) Pressure, 50 PSIG
(2) .5 M/L NaCl Present in all Solutions

| Test | Base Generator | Temp. °F. | pH | Half Life,[1] $t_{\frac{1}{2}}$ hours |
|---|---|---|---|---|
| 1 | Urea | 210 | 6.2 | 12.3 |
| 2 | " | 208 | 5.5 | 8.4 |
| 3 | " | 208 | 7.0 | 45.2 |
| 4 | " | 211 | 8.0 | 15.9 |
| 5 | Succinimide | 177 | 7.0 | 28.4 |
| 6 | " | 177 | 6.0 | 184.1 |
| 7 | " | 206 | 6.0 | 31.3 |
| 8 | Maleimide | 206 | 6.0 | too fast |
| 9 | " | 140 | 6.0 | 18.4 |
| 10 | " | 96 | 6.0 | 53.6 |
| 11 | " | 76 | 6.0 | 450.1 |
| 12 | Maleimide | 109 | 6.0 | 92.0 |
| 13 | " | 109 | 7.0 | 35.0 |
| 14 | " | 110 | 6.5 | 43.8 |
| 15 | " | 110 | 5.5 | 439.0 |
| 16 | KOCN | 78 | 6.0 | 19.6 |
| 17 | " | 78 | 6.5 | 68.6 |
| 18 | " | 78 | 7.0 | 206.4 |
| 19 | KOCN | 99 | 7.0 | ~94.0 |
| 20 | " | 99 | 7.5 | ~223.0 |
| 21 | " | 116 | 8.0 | ~223.0 |
| 22 | $NaNO_2$ | 212 | 6.0 | 80.0 |
| 23 | " | 279 | 6.0 | 49.2 |
| 24 | " | 279 | 5.5 | 17.5 |
| 25 | $NaNO_2$ | 279 | 7.0 | 141.4 |
| 26 | " | 280 | 6.5 | 84.9 |
| 27 | " | 296 | 6.5 | 73.2 |
| 28 | Urea + $NaNO_2$ | 138 | 6.5 | no reaction |
| 29 | Urea + $NaNO_2$ | 184 | 6.5 | 41.0 |
| 30 | Urea + $NaNO_2$ | 180 | 6.0 | 52.3 |

TABLE III-continued

Hydrolysis Data - Screening Tests
Conditions: (1) Pressure, 50 PSIG
(2) .5 M/L NaCl Present in all Solutions

| Test | Base Generator | Temp. °F. | pH | Half Life,[1] $t_{\frac{1}{2}}$ hours |
|---|---|---|---|---|
| 31 | Urea + $NaNO_2$ | 190 | 6.0 | 19.3 |
| 32 | Propylene oxide | 106 | 6.0 | 26.5 |
| 33 | " | 122 | 6.0 | 26.0 |
| 34 | " | 122 | 7.0 | 35.6 |
| 35 | " | 76 | 7.0 | 86.1 |

[1]This is the time, in hours, required for the base generator to be $\frac{1}{2}$ reacted. This is a convenient way to measure the speed of a reaction.

The patterns of the concentrations of dissolved $CO_2$ and dissolved bicarbonate with amounts of fluid produced from the reservoir being tested (and/or concentrations with time where the production rate is substantially constant) can be measured by currently known and available methods and apparatus. It is a distinctive advantage of the present process that known and available relatively simple procedures, such as titrometric and/or thermetric analyses, can be utilized to measure the chromatographic separation between the $CO_2$ partitioned between the phases and the acid anions dissolved substantially completely in the mobile phase of the reservoir fluid.

In a preferred procedure for measuring residual oil saturation, water produced from (or equivalent to) the water in the reservoir is used as the injected aqueous fluid. Where that water is substantially free of dissolved $CO_2$, a selected amount, such as about 0.001 M/L to 0.100 M/L is dissolved in the water. While injecting that solution, a base generating reactant is incorporated in the inflowed water in a concentration of about 0.0005 M/L to 0.0500 M/L and a volume sufficient to form a slug occupying the desired pore volume of the reservoir. The base generating reactant-containing solution is displaced a selected distance, such as about 5 to 25 feet from the well, by injecting the $CO_2$-containing water while omitting the base generating reactant. After time enough for the depletion of a significant proportion, or all, of the $CO_2$ in the base generating reactant-containing fluid, the injected fluid is backflowed and analyzed.

In general, it is preferable to select the base generating reactant relative to a pumping grate to be used the distance from the well at which the measurement is to be made and the temperature to be encountered within the reservoir. This indicates the time temperature exposure to be encountered by the base generating reactant during the inflowing of the solution containing it. Relative to the exposure to be encountered, the reactant can be selected so that no more than about 20–30 percent or in the order of about $\frac{1}{3}$ of the reactant will be spent while the fluid containing it is being pumped into the reservoir. In such a situation the soak period for the completion of the reaction need only be about 3 times as long as the pump-in time.

What is claimed is:

1. A process for determining the relative concentrations of substantially immobile oil phase fluid and relatively mobile water phase fluid within a subterranean reservoir formation comprising:

injecting fluid consisting essentially of an aqueous solution which at least soon after entering the reservoir formation contains at least a detectible concentration of dissolved $CO_2$ and a concentration of subsequently active pH increasing reactant material which at the temperature of the reservoir formation is sufficient to convert a significant proportion of the dissolved $CO_2$ to dissolved bicarbonate ion;

then injecting an aqueous solution which contains at least said concentration of dissolved $CO_2$ but is free of said reactant;

allowing the occurrence of said pH increasing reaction;

producing the injected fluid and measuring the variation with amount of fluid produced in the concentration of both dissolved $CO_2$ and dissolved bicarbonate ion; and determining relative concentrations of said oil phase and water phase fluids indicated by the extent of chromatographic separation between the reduction in concentration of dissolved $CO_2$ and the increase in concentration of dissolved bicarbonate ion.

2. The process of claim 1 in which the injected $CO_2$-containing fluid is water produced from the reservoir being tested.

3. The process of claim 1 in which a stream of $CO_2$-containing water is pumped into the reservoir and a suitable flow rate and a portion of the inflowing stream is converted to fluid containing the subsequently active pH increasing reactant material by mixing enough of that base generating material with the inflowing stream to provide a suitably sized slug of solution containing the base generating material and then continuing to pump in the $CO_2$-containing material free of that reactant to displace the reacting-containing solution to the selected distance within the reservoir.

4. The process of claim 1 in which the pH increasing reactant material is at least one compound of the group urea potassium cyanate sodium nitrite and propylene oxide.

5. The process of claim 1 in which the injected $CO_2$ and base generating reactant solution contains about 0.001 to 0.1 M/L dissolved $CO_2$ about 0.0005 to 0.05 M/L of the base generating reactant and has a volume occupying the desired pore volume of the reservoir when displaced about 5-25 feet from the well through which it is injected.

* * * * *